(No Model.)  7 Sheets—Sheet 1.

G. WEISS.
NUT TAPPING MACHINE.

No. 604,447. Patented May 24, 1898.

Fig. 1.

Witnesses:
Chs. E. Gaylord.
Lute S. Miter

Inventor:
Georg Weiss,
By Banning & Banning & Sheridan,
Attys.

(No Model.) 7 Sheets—Sheet 3.

G. WEISS.
NUT TAPPING MACHINE.

No. 604,447. Patented May 24, 1898.

Fig. 3.

WITNESSES:
Bertha Weiss.
Chas. Klinge.

INVENTOR
Georg Weiss.
BY
Bruning & Bruning & Sheridan,
ATTORNEYS (No Model.) 7 Sheets—Sheet 4.

G. WEISS.
NUT TAPPING MACHINE.

No. 604,447. Patented May 24, 1898.

WITNESSES:
Bertha Weiss.
Chas. Klinge.

INVENTOR
Georg Weiss.
BY
Banning & Banning & Sheridan,
ATTORNEYS

(No Model.) 7 Sheets—Sheet 6.

G. WEISS.
NUT TAPPING MACHINE.

No. 604,447. Patented May 24, 1898.

WITNESSES:
Bertha Weiss.
Chas. Klinge.

INVENTOR
Georg Weiss.
BY
Banning & Banning & Sheridan
ATTORNEYS

UNITED STATES PATENT OFFICE.

GEORG WEISS, OF CHICAGO, ILLINOIS.

NUT-TAPPING MACHINE.

SPECIFICATION forming part of Letters Patent No. 604,447, dated May 24, 1898.

Application filed February 15, 1897. Serial No. 623,501. (No model.)

*To all whom it may concern:*

Be it known that I, GEORG WEISS, a citizen of the United States, residing at Chicago, in the county of Cook and State of Illinois, have invented certain new and useful Improvements in Nut-Tapping Machines, of which the following is a specification.

My invention relates to that class of nut-tapping machines in which the taps and their holding mechanism are arranged in gangs, and it has particular reference to mechanisms in which the taps and their operating devices, as well as feeding mechanism, are arranged on substantially equidistant points of a circle.

The object of my invention is to provide a simple, economical, and efficient automatic nut-tapping machine; and the invention consists in the features, combinations, and details of construction hereinafter described and claimed.

In the accompanying drawings, Fig. 2, a plan view of the same, looking at it from the top; Fig. 16, a plan view, partly in section, of a portion of the mechanism shown in Fig. 13 and practically a plan view of that portion of the mechanism taken on line 16 of Fig. 24; Fig. 17, a sectional view of one of the brackets for holding the feed-blocks for the tapping-spindles; Fig. 18, a side elevation, partly in section, showing the bracket and a portion of the tap-holding spindle and feeding mechanism, &c.; Fig. 19, a transverse section taken on line 19 of Fig. 18; Figs. 20, 21, 22, and 23, detail views of the driving-pulleys and belt-shifting mechanism; Fig. 24, a vertical sectional elevation of a portion of the hopper and feeding mechanism, taken on line 24 of Fig. 16; Fig. 24$^a$, a plan view of a portion of the ratchet-wheel and driving-pawl for rotating the hopper, and Figs. 25 and 26 detail views of the bracket for holding the feeding mechanism of the tapping-spindles and a modified form of safety mechanism to prevent breakage of the parts.

In the art to which this invention relates it has been common and customary to arrange the taps, with their holding-spindles, and the mechanism for feeding the nuts to a position to be tapped in gangs in a straight line. There have been various objections to this class of machines, the principal of which are that they take up considerable space and that the mechanism for operating them has necessarily to be multiplied, which makes them expensive to manufacture and repair. Further, such machines are not as economical to operate, in that they take up considerable more space. My invention is intended, primarily, to remove these objections and to provide simple and efficient mechanism in which the taps are held on the points of a circle and the nuts fed and held in position on the points of a circle for the taps to operate on the same.

Further advantages and points of invention will be readily apparent from the following description and an inspection of the drawings.

Figure 1:
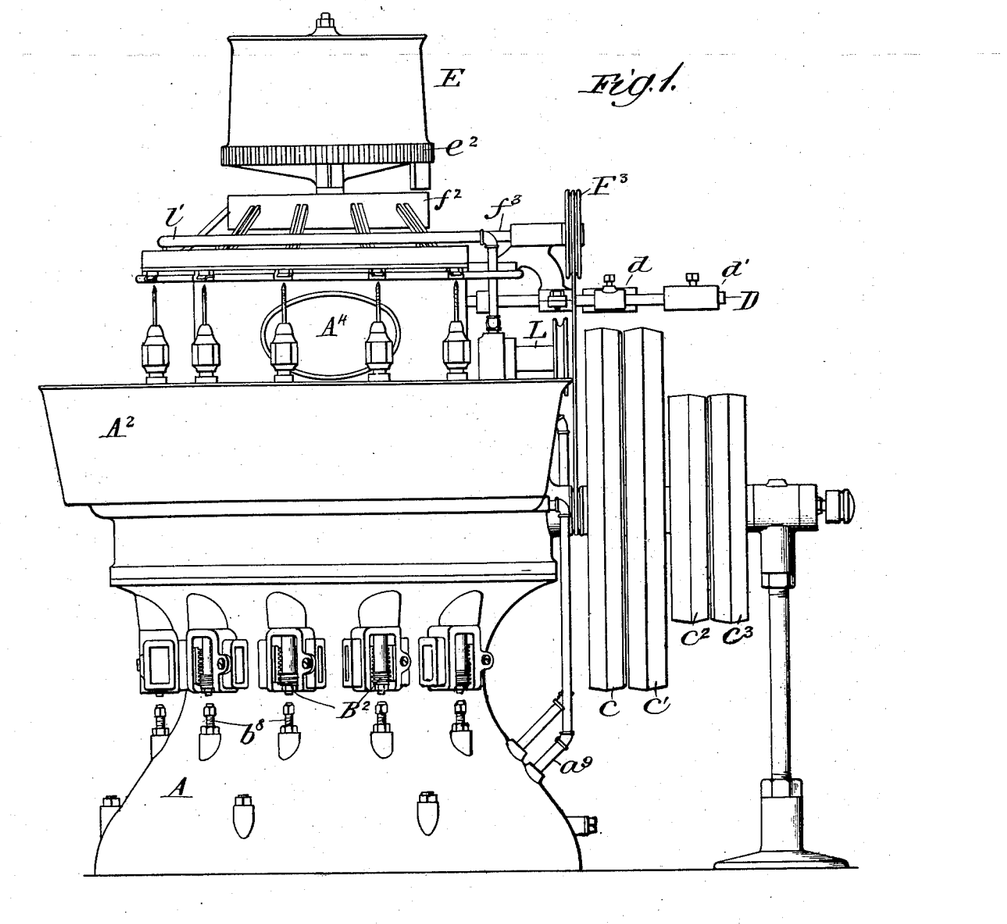
Figure 1 is a side elevation of a machine constructed in accordance with my improvements.
Figures 2, 25, 26:
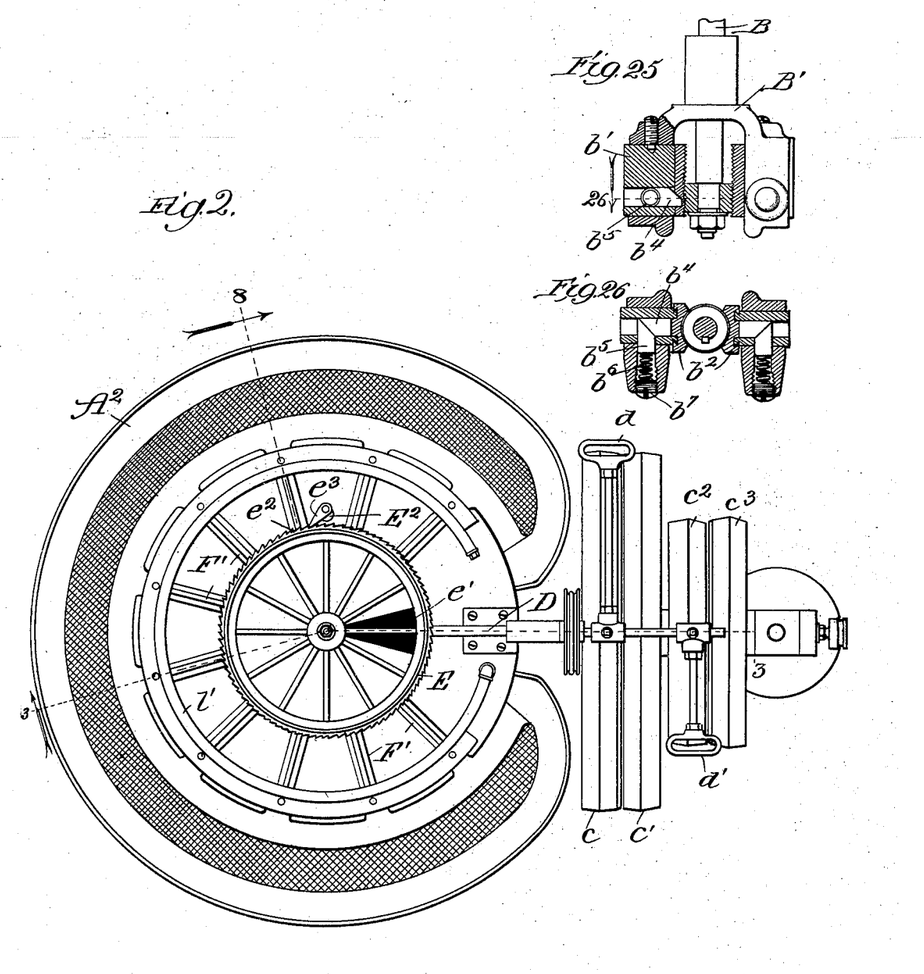
Figure 3:
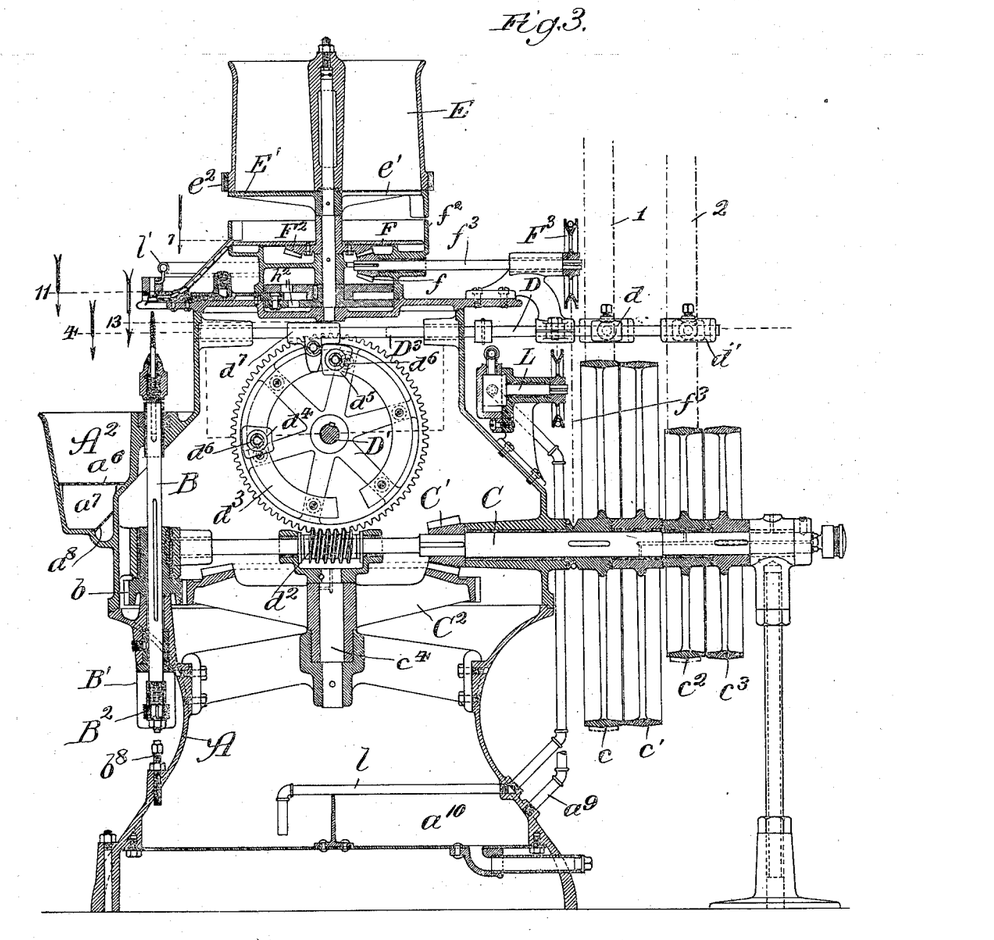
Fig. 3, a vertical sectional elevation taken on line 3 of Fig. 2.
Figure 4:
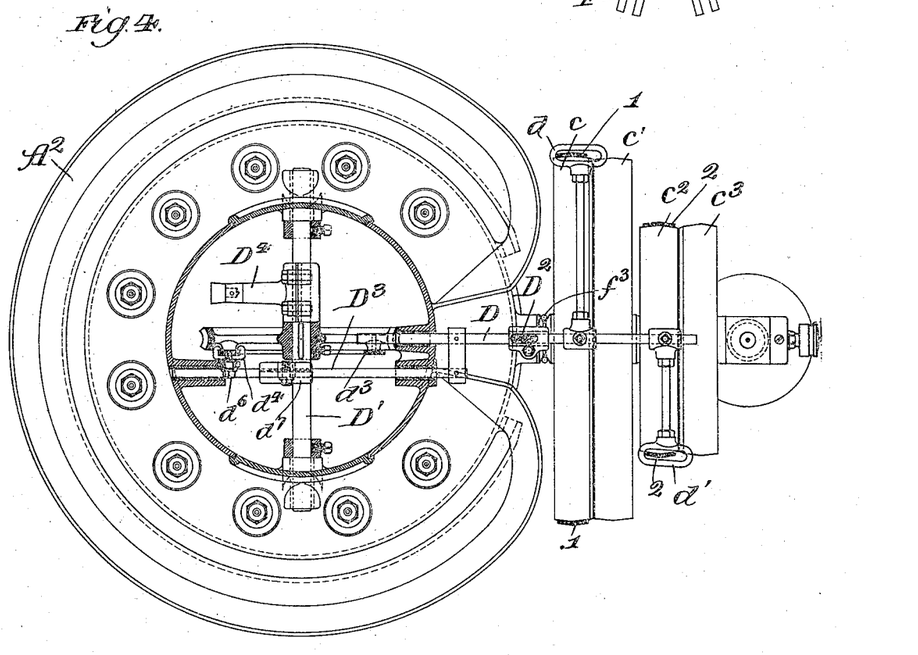
Fig. 4, a plan sectional view, taken on line 4 of Fig. 3, looking in the direction of the arrow.

In constructing a machine in accordance with my improvements I provide a frame A of the desired size and shape, preferring the forms shown in Figs. 1, 2, and 3, which are substantially cylindrical in contour. I mount in suitable bearings in this frame portion a set or gang of tapping-spindles B and arrange them on points of a circle substantially equidistant from each other, though of course this relation can be varied slightly one way or the other without interfering with the operation of the machine or departing from the spirit of my invention. As shown in Fig. 4 of the drawings, I have provided ten tapping-spindles on equidistant points of a circle, the only break that occurs being between the first and tenth spindles, where practically two spindles are left out to provide a space through which the driving mechanism of the nut-feeding mechanism may be operated. To operate these tapping-spindles and give them the necessary forward-and-backward rotation as is required, I provide a horizontal driving-shaft C, which has two sets of tight and loose pulleys $c$, $c'$, $c^2$, and $c^3$. The pulleys $c$ and $c'$ give the slow rotary motion necessary for the operation of tapping, while the small pulleys $c^2$ and $c^3$ are for the purpose of giving the fast reverse or backward rotation to remove the taps from the nuts. I provide this driving-shaft with a bevel-pinion C', meshing with what is termed in the art a "compound" or "contrate" gear-wheel C²—that is, a wheel having beveled teeth and spur-teeth. This compound gear is loosely and rotatably mounted upon a stud $c^4$, so that it may have the desired rotations in a horizontal plane, its spur-teeth engaging with the spur-teeth of pinions $b$, that engage with and rotate the tapping-spindles and in which the spindles are slidingly mounted. By this means it will be seen that the necessary rotary movements are economically given to the tapping-spindles, so that they may rise and fall as desired.

In order to feed the taps upwardly to tap the nuts in a manner coincident with their pitch, I provide the frame with a set of brackets B', holding therein two blocks $b'$ at each side of the tapping-spindles. These blocks have secured thereto in any suitable way a split or bifurcated feed-nut $b^2$, that is held in fixed position by means of the pins $b^3$, so that under ordinary circumstances the nuts and their holding-blocks are one rigid integral piece. The lower ends of the tapping-spindles are provided with a set of threaded sleeves or washers B², that are held therein in any convenient manner. As shown in the drawings, (see Figs. 18 and 19,) they are held by means of a spline, groove, and nut. When the tapping-spindles are rotated in a right-hand direction, the spindles by means of the split nuts and screws are fed upwardly at a rate equal to the pitch of the tap. Should the tap strike the solid body of a nut and no means be provided for saving it, it is evident that some portion of the machine would be broken. By the means which I have described and shown in connection with Figs. 17, 18, and 19, however, the small pins $b^3$ will break or "shear," and the taps, spindles, nuts, &c., be thus saved from further damage. The old pins can then be easily driven out and new ones reinserted, thus making the machine as efficient as before and at a minimum cost. In Figs. 25 and 26 I have shown a modification of this safety mechanism in which the brackets B', blocks $b'$, and split nuts $b^2$ are substantially the same as described in connection with Figs. 17, 18, and 19. The means for holding the split nuts, however, are different. These split nuts are provided with cam-notches, with which a beveled pin $b^4$ engages, such pin engaging with a second beveled pin $b^5$ at right angles thereto, and both being held at the desired tension by means of a helical coiled spring $b^6$ and an adjustable screw $b^7$. Should the tap strike a solid nut and continue its rotation, the threaded sleeve or washer on the spindle will force the split nuts $b^2$ downwardly and the pin backwardly, thus saving the machine from breakage. The spindles drop down and strike the adjustable screw-studs $b^8$, (shown to the left of Fig. 3,) so that on the reversal of the rotation of the tapping-spindles the bifurcated nuts $b^2$ are forced back into place. I place the holding pins or dogs $b^4$ and $b^5$ at a point below the center of the bifurcated nuts, so as to give the nuts as long a run as possible before they disengage with such dogs for the purposes above described.

As heretofore explained, the large pulleys $c$ $c'$ are the tight and loose spindles for driving the tapping-spindles in a right-hand direction, and the small pulleys $c^2$ and $c^3$ are the pulleys for driving the main driving-shaft, and thus the tapping-spindles, in a reverse or left-hand direction. To shift the belts and drive the spindles as desired, (see Figs. 3 and 4,) I provide a shifting-rod D, having guides $d$ $d'$ at the outer end thereof, through which the belts 1 and 2 pass to the large and small pulleys. The tight pulley of each set is made slightly larger in diameter than the loose pulley and provided with an abrupt bevel-edge to assist in guiding the belt thereon. The belt-guiding loops $d$ and $d'$ are made of a length substantially greater than the width of the belt, (see Fig. 4,) which materially assists the shifting operation. As shown in Fig. 3, the belts are engaging the tight pulley of the large set and the loose pulley of the small set, so as to drive the pulleys, intermediate mechanism, and tapping-spindles in a right-hand direction. This rotates a worm $d^2$ on the driving-spindle, which engages with a worm-gear $d^3$, mounted upon a suitable spindle D', which is in a measure an intermediate driving-spindle. This worm-gear is provided with two blocks $d^4$ and $d^5$, adjustably mounted on a circular way, so that the belts may be allowed to run as long as desired in certain directions. These blocks are provided with rolls $d^6$ and are arranged to strike a finger $d^7$ on the shifting-rod, so that when the tapping-spindles have been rotated sufficiently the shifting-rod will be moved toward the right hand and the belts changed to the loose pulley of the large set and the tight pulley of the small set, thereby causing the rotation of the tapping-spindles in a reverse manner for the required time or until the block $d^5$, with its roll, comes into contact with the finger on the shifting-rod and moves it into its initial position.

Figures 16, 17, 18, 19, 20, 21, 22, 23, 24, 24A:
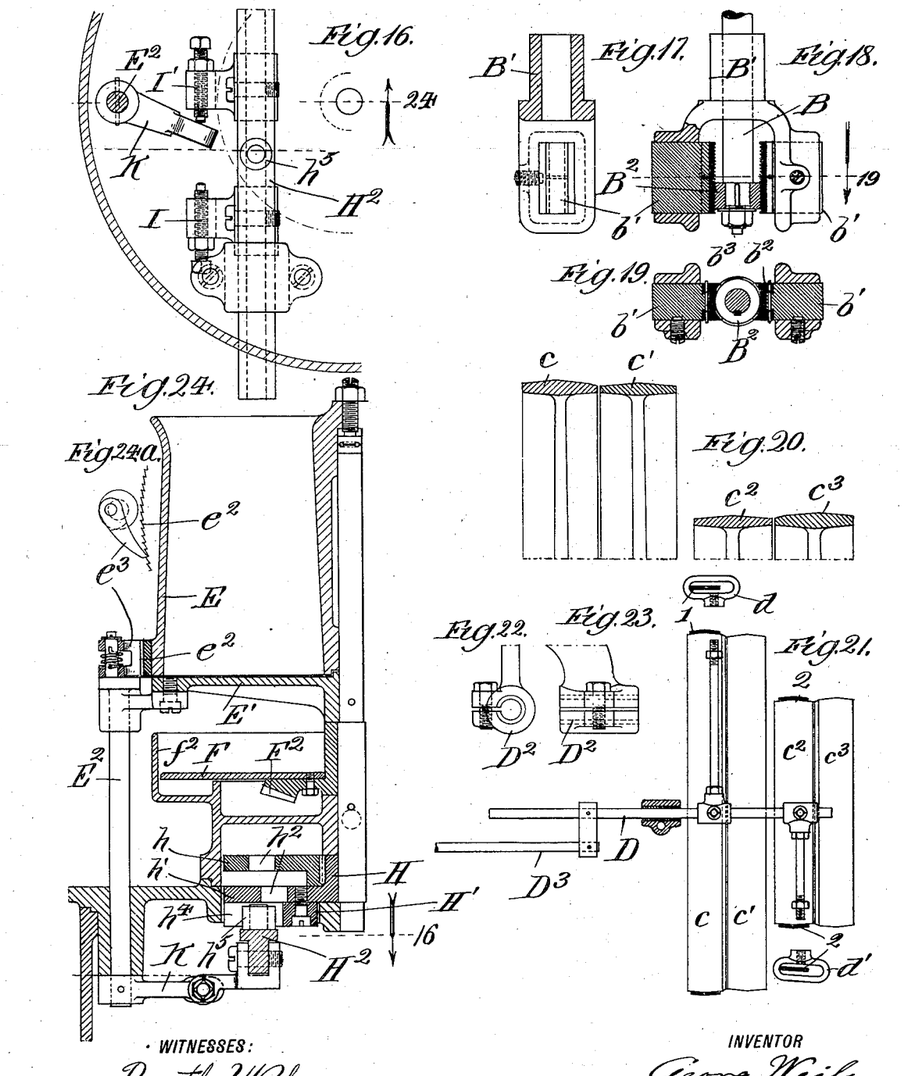

In order to prevent tremor or unnecessary vibrations, it is necessary that one of the bearings D² through which the shifting-rod passes should be split, so as to form a clamp and give the desired frictional engagement with the shifting-rod. As shown in Figs. 4 and 21, the shifting-rod is made in two parts—viz., the rod D and the rod D³. This is simply for economy in operation and construction and to prevent lateral movement of the shifting-rod. It is to the portion $d^3$ that the finger $d^7$ is connected.

Figures 5, 6:
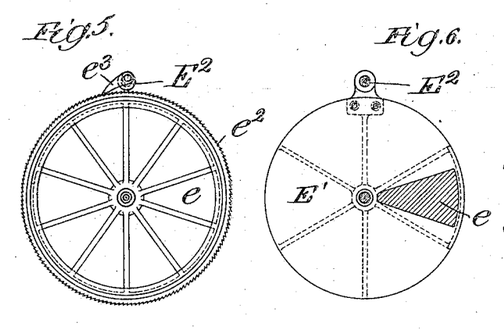
Fig. 5, a plan view of the mechanism for rotating the hopper, looking at it from the top.
Fig. 6, a plan view of the bottom plate of the hopper.
Figure 7:
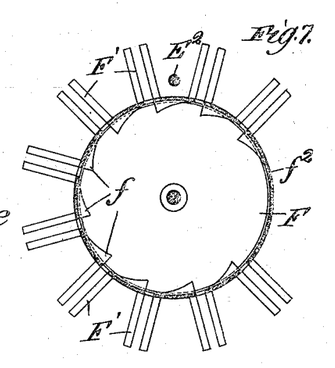
Fig. 7, a plan sectional view of the nut-feeding mechanism, taken on line 7 of Fig. 3, looking in the direction of the arrow.

To feed the nuts into position to be operated upon by the taps in an automatic manner, I provide a hopper E, having vertical partitions that provide vertical chambers $e$. This hopper has no bottom portion and is given a step-by-step rotation, as hereinafter described, which brings each partition in succession over an opening $e'$ in the stationary bottom plate E'. As will be seen from Fig. 5, the hopper is provided with a circular ratchet $e^2$, which is arranged to be engaged by a pawl $e^3$, eccentrically mounted upon a vertical shaft E², which is given its vibratory motion by means hereinafter specified. The arrangement and operation are such that the feeding is constant, though at small steps, and the nuts drop through the hole in the bottom plate onto a rapidly-rotating plate F below the same, which acts to throw the blank nuts by centrifugal action out against the curb or wall $f^2$, which is provided with a number of projecting catches $f'$ adjacent to the runways F', down which the nuts are fed or fall into position, as shown in Figs. 3 and 8, to be operated on by the taps.

In order to rotate the centrifugal feed-plate F as desired, it is provided with a beveled wheel F², engaging with a beveled pinion $f$ on a rotating shaft. This rotating shaft is provided with a sheave-pulley F³, which in turn is provided with a belt $f^3$, engaging with a groove-pulley on the hub of the main driving-pulley $c$, so that the rotations of this pulley when in operation are constantly transmitted to the centrifugal feed-plate. As this pulley rotates first in one direction and then in another, it will be seen that the centrifugal feed-plate is also rotated first in one direction and then in another. These opposite rotations are very advantageous, in that they prevent blocking in the feeding of the nuts and secure an advantageous feeding thereof to their runways.

Figure 8:
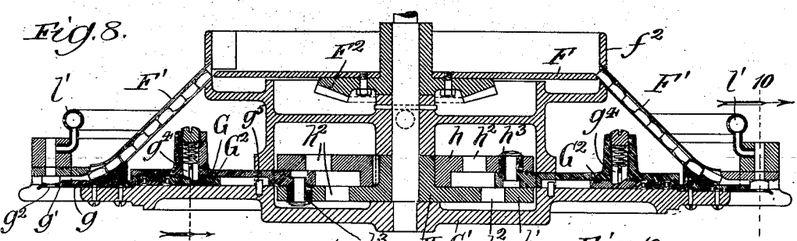
Fig. 8, an enlarged vertical sectional view of the nut-feeding mechanism, taken on lines 8 of Figs. 2 and 11.
Figures 9, 10, 11:
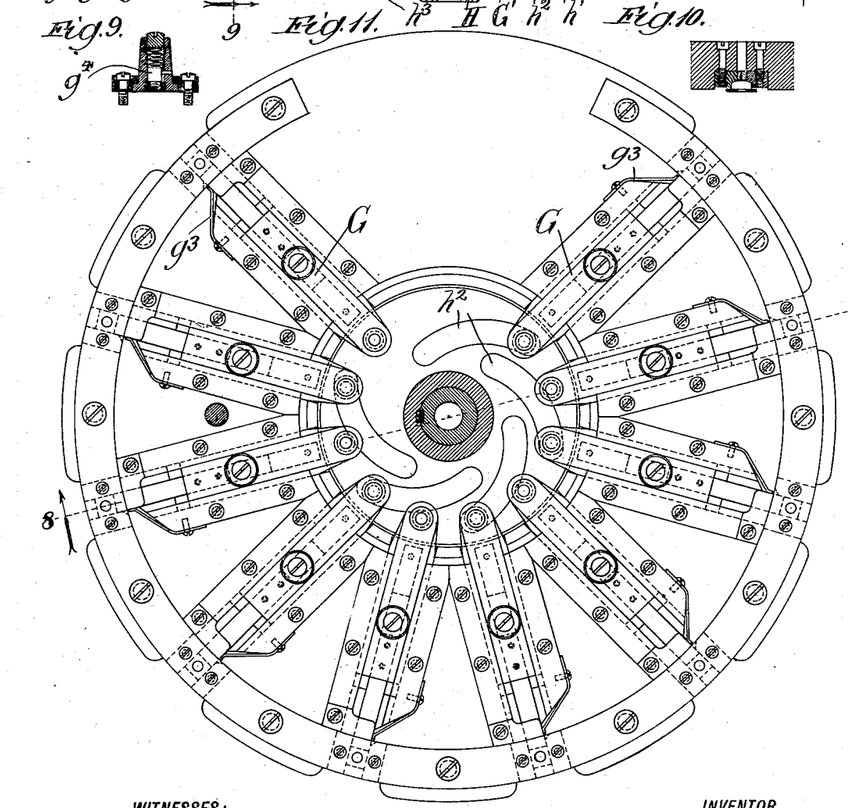
Figs. 9 and 10, transverse sectional views taken on lines 9 and 10, respectively, of Fig. 8.
Fig. 11, an enlarged plan sectional view taken on line 11 of Fig. 3, with a portion of the mechanism removed.
Figure 12:
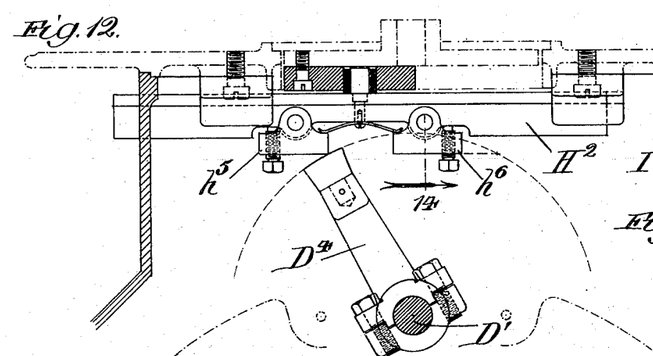
Fig. 12, a sectional view taken on the irregular line 12 of Fig. 13.
Figure 13:
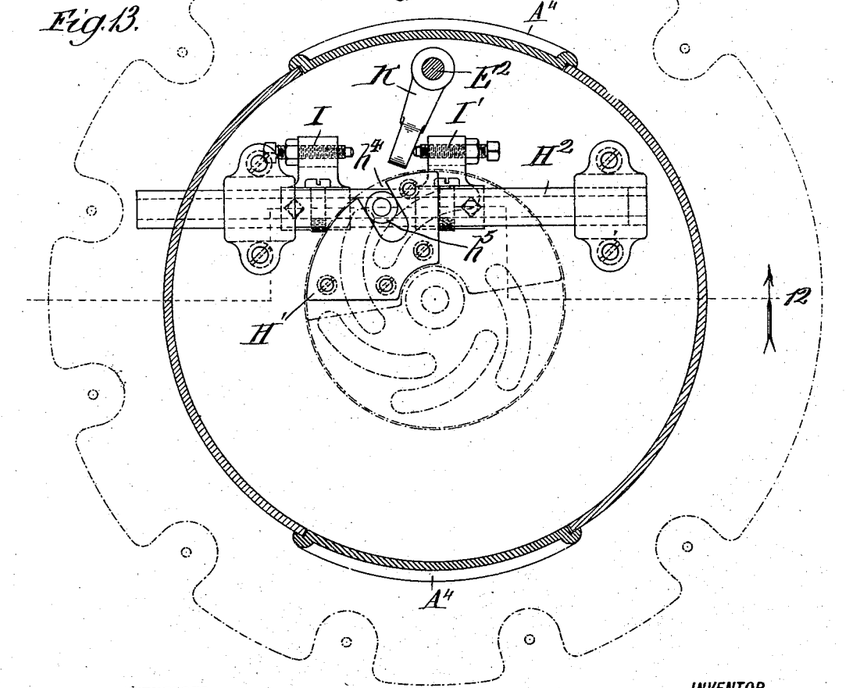
Fig. 13, an enlarged sectional plan view taken on line 13 of Fig. 3.
Figures 14, 15:
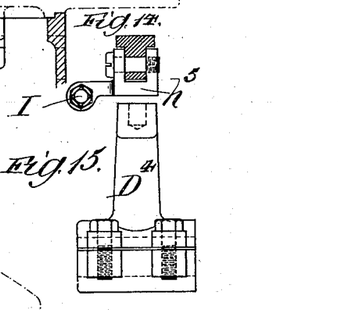
Fig. 14, a transverse sectional view taken on line 14 of Fig. 12.
Fig. 15, a side view of one of the parts (the lever-arm) shown in Fig. 12.

As will be seen from an inspection of Figs. 3 and 8, the runways extend down at an angle of about forty-five degrees, and the nuts are brought into alinement with the taps and held therein by means of radially-movable sliding pushers G. These pushers are provided with a thin forward edge $g$, arranged to contact one nut at a time and push it into the position shown in Fig. 8, while the springs $g'$, which are secured to the table G' and are provided with perforations $g^2$, hold the nuts in such position. When the pushers are retracted, the side springs $g^3$ catch the next nut, and thus prevent all of the nuts from crowding down into position, holding it in such position until the pusher comes forward and catches the next, pushes it into place, and pushes the finished nut out of position, so that it may drop into the trough A², which is secured to the frame of the machine. It may sometimes happen that the nuts in the lower part will clog or cramp in position and that the pusher, striking out with a positive movement, would be broken. In order to prevent such an accident, I prefer to make the pusher-slides in two parts—the main part G, as above noted, and the second part G², slidingly or telescopically mounted therein—both of such parts being held together by means of a notch in one (the lower) and a spring-held pin $g^4$ in the upper. If the nut should become cramped and refuse to be dislodged, it will be seen that the spring $g^4$ will yield and allow the slide to telescope in the upper portion and remain stationary. It is necessary that the parts of the pusher-slide be restored to their normal position, and in order to accomplish this I provide a table with a pin $g^5$, arranged in the way of the pusher, so that when such pusher is retracted the lower one will contact this pin and be forced to resume its normal position. In order to operate these pushers and give them their reciprocating motion, I provide a double cam H, having two disks $h$ $h'$, between which the inner ends of the pushers are inserted. The upper disk has a set of eccentric slots $h^2$, which are engaged by rolls $h^3$ on one half of the pushers. The lower disk has a corresponding number of eccentric grooves—"cam-grooves," as they may be termed—which engage rolls $h^3$ on the remaining half of the pushers, the principal reason for the two disks being the want of room for all of the cam-grooves in one disk. This cam is given its vibratory motion by means of a segmental plate H', Fig. 13, which is secured to the lower disk by means of screws or otherwise and is provided with a radial slot $h^4$, which is engaged by a roll $h^5$ on a sliding bar H². This sliding bar is provided with two adjustable lugs $h^6$ $h^6$, secured thereto in the manner shown in Fig. 14, and the intermediate driving-shaft D' is provided with a vibrating lever-arm D⁴, the free end of which is arranged to contact one or the other of the lugs above noted. As shown in Fig. 12, when the intermediate driving-shaft is vibrating in one direction—viz., to the right—the sliding bar H² is moved also to the right, so that when looking down on the cam-disks such disks are also vibrated to the right, thereby forcing the rolls on the pushers inwardly and retracting the pushers. When the reverse motion takes place by the mechanisms above described, the lever-arm is vibrated in the opposite manner to contact the lug $h^5$, vibrate the cam-disks to the left, force the pusher outwardly, and push a set of nuts into position to be operated upon. It will thus be seen that at every reversal of the rotations of the main pulleys the pusher is retracted, and at the forward movement a set of finished nuts are forced out of the holders and a new blank set forced into position to be operated upon.

To transmit the necessary power and motion to the pawl that rotates the hopper in a step-by-step manner, I provide the sliding bar with a second set of adjustable lugs I and I', arranged to contact a second lever-arm K on the lower end of the vertical shaft $E^2$, hereinbefore referred to, the upper end of which is provided with the pawl $e^3$.

The frame is provided with a trough $A^2$, hereinbefore referred to, which acts to catch the nuts, separate the chips, and withdraw the oil, so that it may be used over and over again in an economical manner. In order to accomplish these results, the trough is provided with a primary perforated plate $a^6$, upon which the nuts fall, the chips and liquid which assist in tapping falling through into the chamber $a^7$, which is provided with a second perforated bottom $a^8$ of finer mesh, through which the fluid only can pass and from which it passes out by means of the pipe $a^9$ into the chambers $a^{10}$ inside of the frame. By this arrangement it will be seen that the nuts can be taken out without having to separate them from the chips and the chips then removed in an economical and efficient manner.

I provide a pump L, which is connected with the interior liquid-chamber by means of a pipe $l$ and which is further provided with a supply-pipe $l'$, that leads to a point on the table above where the nuts are held in position, so that a supply of liquid in the shape of soapy water, soda-water, or oil may be furnished during the operation of tapping to facilitate the same. The frame is provided with doors $A^4$, so that the interior mechanism may be readily got at for the purpose of adjusting or changing the same.

I claim—

1. In a nut-tapping machine, a series of circularly-arranged tapping-spindles provided with spur-pinions, radially-arranged chutes and pushers coacting therewith, in combination with a centrally-located driving-gear meshing with the pinions on the tapping-spindles and receiving its motion directly from the driving-shaft, and a driving-shaft arranged at right angles to the rotation of the centrally-located driving-gear and arranged to drive the same, substantially as described.

2. In a nut-tapping machine, the combination of a frame portion, a set of spindles rotatably and vertically mounted in such frame portion on substantially equidistant points of a circle, mechanism for operating the spindles in the desired manner and feeding them forward, a centrifugally-acting plate for feeding the nuts forward to position, a series of radially-arranged pushers for feeding the nuts forward after they have left the centrifugally-acting plate into position to be acted on by the tapping-spindles, and a centrally-located disk provided with a series of cams adapted to impart the desired motion to the pushers, substantially as described.

3. In a nut-tapping machine, the means for feeding the nuts forward into position, which consists of an oscillating cam moving in a horizontal plane, a set of radially-mounted pushers provided with portions engaging with the cam, whereby the pushers are moved in and out at the desired times, and means for vibrating the cam in a right-hand and left-hand manner, substantially as described.

4. In a nut-tapping machine, the means for feeding the nuts forward into position, which consists in the combination of a double set of oscillating cam-disks arranged in different horizontal planes provided with a set of eccentric cam-grooves, a set of radially-mounted pushers provided with portions arranged so that one half engages with the cam-grooves of such disks whereby the pushers are moved in and out at the desired times, and means for vibrating the cam in a right-hand and left-hand manner, substantially as described.

5. In a nut-tapping machine, the means for pushing the nuts forward into position, which consists of a set of pushers each made in two portions one portion slidingly mounted in the other—one portion of each pusher having a notch and the other portion a spring-actuated pin to engage with the notch and permit the parts to be collapsed or extended, substantially as described.

6. In a nut-tapping machine, the means for feeding the nuts forward, which consists of a set of vibrating cam-disks having a set of eccentric cam-grooves, a set of radially-mounted and movable pushers engaging with the grooves so that the vibrations of the cam reciprocate the pushers in the desired manner, an independently-movable outer portion of each pusher slidingly mounted in the main portion of the pusher and provided with a notch in its upper surface, a spring-actuated plug in the main portion of the pusher adapted to engage with the notch in the independently-movable portion of the pusher and hold the same in position or permit it to move relatively inwardly when striking a rigid article, a pin $g^5$ arranged on a stationary portion of the machine and in the path of the pusher to force the pushers into their extended position, substantially as described.

7. In a nut-tapping machine, the means for operating or feeding forward the nuts, which consists in the combination of a main driving-shaft, an intermediate driving-shaft, means for transmitting power or motion from the main driving-shaft to the intermediate shaft in a vibratory manner, a reciprocating sliding bar $H^2$ provided with lugs adjustably mounted thereon, a lever-arm secured to the intermediate driving-shaft and arranged to contact the lugs and reciprocate said sliding bar, a cam vibratingly mounted in a horizontal plane, mechanism on the sliding bar engaging with the vibrating cam to vibrate the same by the reciprocations of the sliding bar, and a set of reciprocating pushers arranged to be actuated by the cam to feed the blank nuts forward into position, substantially as described.

8. In a nut-tapping machine, the means for holding and feeding the nuts forward, which consists in the combination of a hopper arranged to have a step-by-step rotation, a circular ratchet on such hopper, a vertical shaft provided with a dog or pawl eccentrically mounted on the upper portion thereof to move the hopper in a step-by-step manner, a lever-arm on the lower portion of said vertical shaft, a sliding bar $H^2$ provided with adjustable lugs I I' arranged to contact the lever-arm and vibrate the same during the reciprocations of the sliding bar, a second set of lugs $h^5$ and $h^6$ on said sliding bar, a vibrating shaft D' provided with a lever-arm $D^4$ arranged to contact the second set of lugs and reciprocate the sliding bar, and means for transmitting power and motion to the vibratory shaft, substantially as described.

9. In a machine of the class described, the belt-shifting device which consists of a combination of tight and loose pulleys of different diameters one of which is provided with an inner or intermediate abrupt bevel-edge, a belt-guiding loop of substantially greater length than the width of the belt, and an adjustable friction-bearing for preventing the yielding of the shipper-rod and its loop to anything other than the positively-actuating mechanism, and a shipper-rod for carrying the belt-guiding loop mounted in the adjustable friction-bearing, substantially as described.

GEORG WEISS.

Witnesses:
 THOMAS A. BANNING,
 THOMAS B. MCGREGOR.